United States Patent
Bauer et al.

[11] Patent Number: 5,988,517
[45] Date of Patent: Nov. 23, 1999

[54] METHOD AND SYSTEM FOR CONTROLLING AN AUTOMOTIVE HVAC SYSTEM BASED ON THE PRINCIPLE OF HVAC WORK

[75] Inventors: Michael Bradley Bauer, Detroit; Leighton Ira Davis, Jr., Ann Arbor, both of Mich.

[73] Assignee: Ford Global Technologies, Inc., Dearborn, Mich.

[21] Appl. No.: 08/871,803

[22] Filed: Jun. 9, 1997

[51] Int. Cl.⁶ .................................. F24F 7/00; F24F 3/00
[52] U.S. Cl. .......................... 236/49.3; 62/179; 165/217
[58] Field of Search ............................ 236/49.3, 91 C; 165/217; 62/179

[56] References Cited

U.S. PATENT DOCUMENTS

| | | | |
|---|---|---|---|
| 4,856,710 | 8/1989 | Takada et al. | 236/91 C |
| 4,914,924 | 4/1990 | Takahashi | 236/91 C |
| 5,427,313 | 6/1995 | Davis, Jr. et al. | 236/49.3 |
| 5,491,775 | 2/1996 | Madau et al. | 395/900 |
| 5,516,041 | 5/1996 | Davis, Jr. et al. | 236/49.3 |
| 5,549,152 | 8/1996 | Davis, Jr. et al. | 165/201 |
| 5,553,776 | 9/1996 | Davis, Jr. et al. | 236/49.3 |
| 5,570,838 | 11/1996 | Davis, Jr. et al. | 236/49.3 |
| 5,579,994 | 12/1996 | Davis, Jr. et al. | 236/49.3 |
| 5,607,105 | 3/1997 | Samukawa et al. | 236/49.3 |

*Primary Examiner*—William Wayner
*Attorney, Agent, or Firm*—Paul K. Godwin; Roger L. May

[57] ABSTRACT

A method and system for automatically controlling a heating, ventilation and air-conditioning (HVAC) system of a vehicle in order to achieve thermal comfort of an occupant of the automotive vehicle receives a plurality of input signals representative of ambient temperature, sunload, and a set-point temperature. A desired amount of HVAC Work necessary to achieve thermal comfort is determined based on either a target temperature or a model of an occupant's thermal comfort. A controller controls the HVAC system based on the desired amount of HVAC Work.

11 Claims, 3 Drawing Sheets

5,988,517

METHOD AND SYSTEM FOR CONTROLLING AN AUTOMOTIVE HVAC SYSTEM BASED ON THE PRINCIPLE OF HVAC WORK

TECHNICAL FIELD

This invention relates to methods and systems for controlling an automotive HVAC system based on an amount of HVAC Work required to achieve thermal comfort of an occupant of the automotive vehicle.

BACKGROUND ART

A fundamental goal of automotive heating, ventilating, and air conditioning (HVAC) systems is to make vehicle occupants comfortable. To achieve this goal, it is important that the design of the control system that establishes cabin conditions takes into account the relationship between comfort and the variables that affect comfort. Human comfort is a complex reaction, involving physical, biological, and psychological responses to the given conditions. Because of this complexity, the engineer must consider many variables and their possible interaction in the design strategy of such a control system or controller.

In an attempt to measure and control the many variables that affect comfort, modern automotive HVAC systems have many sensors and control actuators. A typical system might have a temperature sensor inside the cabin, one measuring ambient temperature outside and others measuring various temperatures of the system internal workings. The occupant may have some input to the system via a set point or other adjustment. Additional sensors measuring sun heating load, humidity, etc. might be available to the system. The set of actuators might include a variable speed blower, some means for varying air temperature, ducting and doors to control the direction of air flow and the ratio of fresh to recirculated air.

The traditional control strategy of an HVAC system utilizes a linear control equation in which an arbitrary number whose scale is chosen more for microchip related numerics rather than for physical significance. This matter of scaling may seem to be a minor point, however, if temperature control calibrations are to be pre-calculated in a vehicle simulation, it is essential to give this equation physical meaning and tie comfort, work, and vehicle-specific variables together.

Thus, there exists a need for formulating temperature control equations in terms of physical quantities, such as work, temperature and air flow rate. Such equations will then have a connection with available Computer Aided Engineering (CAE) tools for initial development in a computer rather than on a vehicle test trip.

DISCLOSURE OF THE INVENTION

It is thus a general object of the present invention to provide a method and system for controlling temperature in an automotive vehicle utilizing control equations that take into account physical quantities, such as work, temperature and air flow rate.

In carrying out the above object and other objects, features, and advantages of the present invention, a method is provided for automatically controlling a heating, ventilation and air-conditioning (HVAC) system of a vehicle to achieve thermal comfort of an occupant of the automotive vehicle. The method includes the step of receiving a plurality of input signals. The method also includes the step of determining a desired amount of HVAC Work necessary to achieve a desired level of thermal comfort based on the plurality of input signals. Finally, the method includes the step of controlling the HVAC system based on the desired amount of HVAC Work.

In further carrying out the above object and other objects, features, and advantages of the present invention, a system is also provided for carrying out the steps of the above described method. The system includes a plurality of sensors for sensing a plurality of input signals. The system also includes a controller for determining a desired amount of HVAC Work necessary to achieve a desired level of thermal comfort based on the plurality of input signals and controlling the HVAC system based on the desired amount of HVAC Work.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
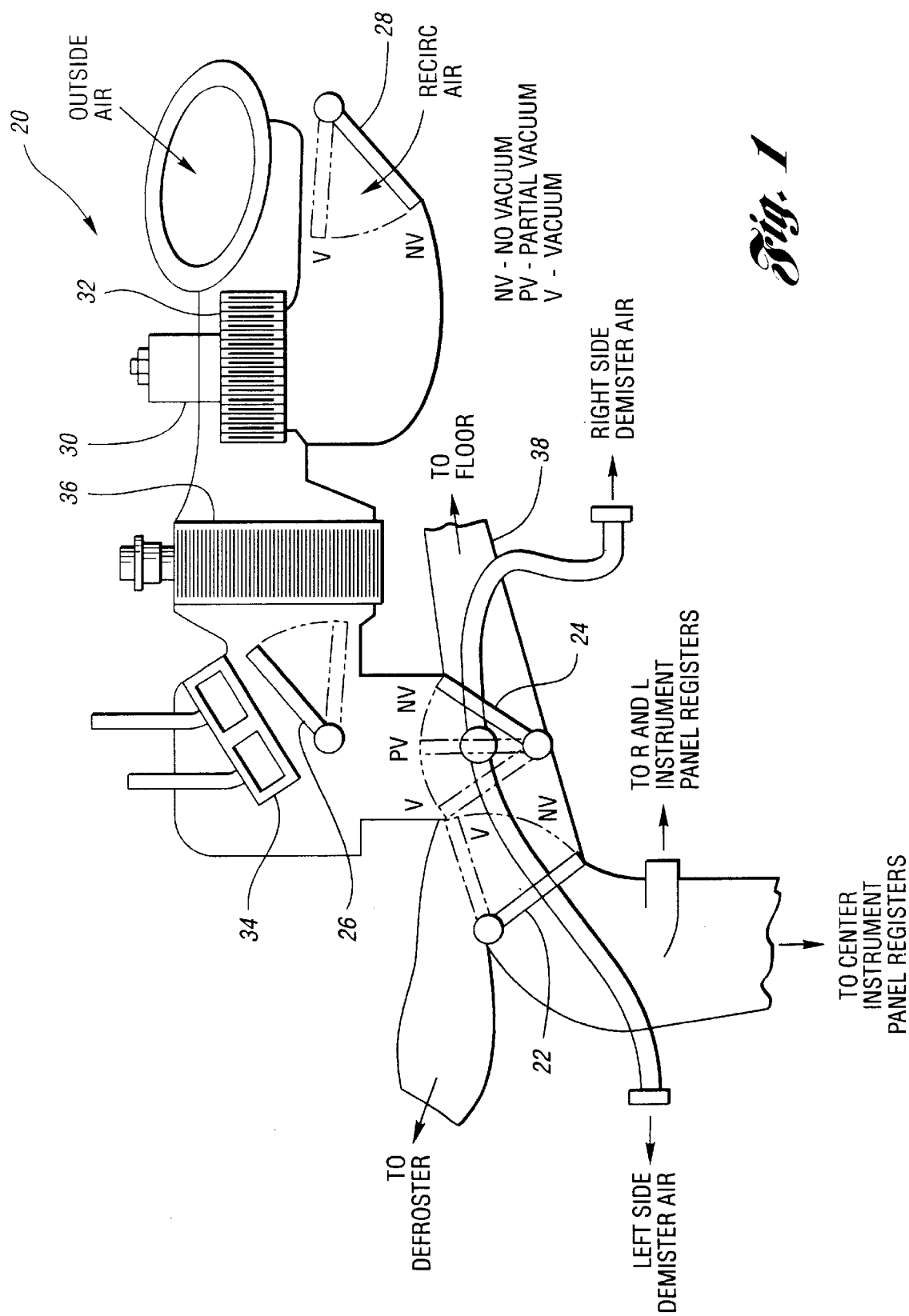
FIG. 1 is a schematic diagram illustrating an air handling system which can be controlled by the method and control system of the present invention.

In general, control of temperature within an automobile is accomplished using various actuators to adjust the temperature and flow of air supplied to the cabin of the vehicle. FIG. 1 shows schematically an air handling system of an HVAC (heating, ventilation and air conditioning) system, generally indicated at 20. The system 20 includes the arrangement of panel-defrost, floor-panel, temperature control and outside recirc air actuators or doors 22, 24, 26 and 28, respectively. The doors 22, 24 and 28 are typically driven by vacuum motors (not shown) between their various vacuum, partial vacuum and no vacuum positions in a conventional fashion as indicated in FIG. 1. The door 26 is driven by an electric servo motor also in a conventional fashion.

The system 20 also includes a variable speed blower motor or fan 30 including a blower wheel 32.

The system further includes heating and cooling elements such as a heater core 34 and an evaporator core 36 in a typical vehicle air conditioning plant. Each of the above components is in communication with ducting 38 in order to control temperature, the direction of air flow and the ratio of fresh air to recirculated air.

Figure 2:
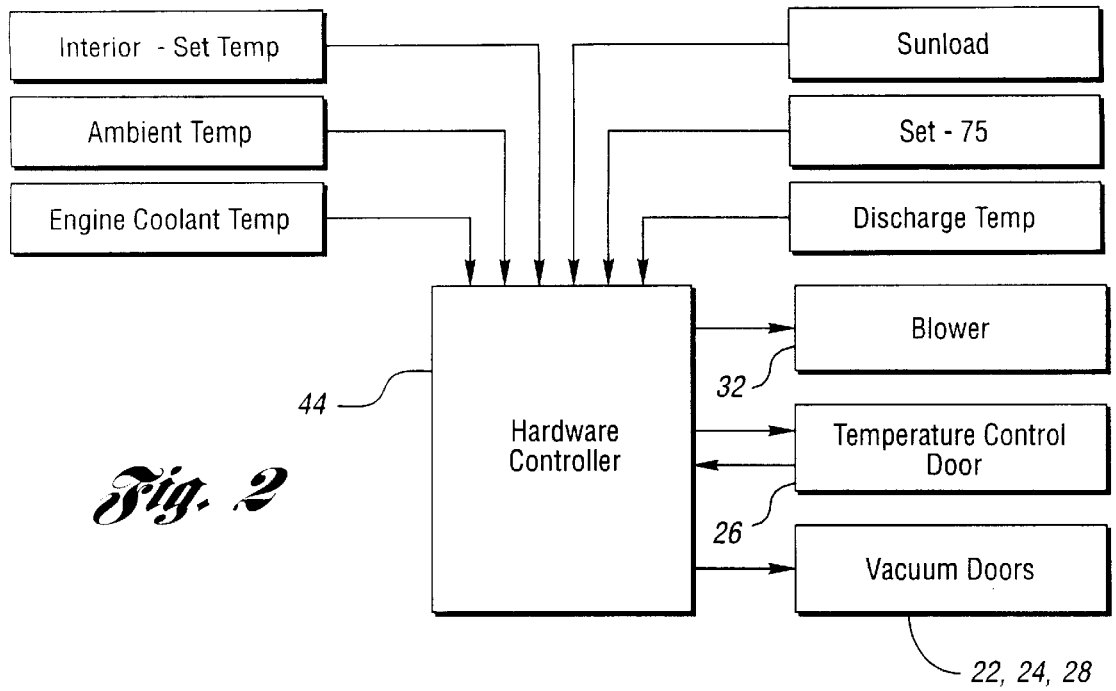
FIG. 2 is a schematic block diagram of the control system of the present invention.

For automatic control of the temperature and flow of air in the cabin, conditions within and outside the cabin are monitored by sensors and an electronic controller generates signals to control the plant actuators according to the conditions as indicated by the sensors. As illustrated in FIG. 2, a typical complement of sensors of the HVAC system provide signals which are representative of interior temperature, ambient (outside) air temperature, engine coolant temperature (ECT), discharge air temperature and sunload. In addition, there is a set signal or set temperature value indicating the desired temperature that is set manually by the driver.

The signals are provided to a hardware controller 44 as inputs. Hardware controller 44, in turn, controls the doors 22 through 28 to regulate the temperature and flow of air and ultimately to maintain the comfort of driver and passengers in the vehicle.

The automatic temperature control strategy of the present invention is based on the determination of HVAC Work relating to thermal comfort of the occupant of the vehicle. The HVAC system's output is referred to as HVAC Work (or power), which is defined as the combination of air flow rate and discharge air temperature.

Figure 3:
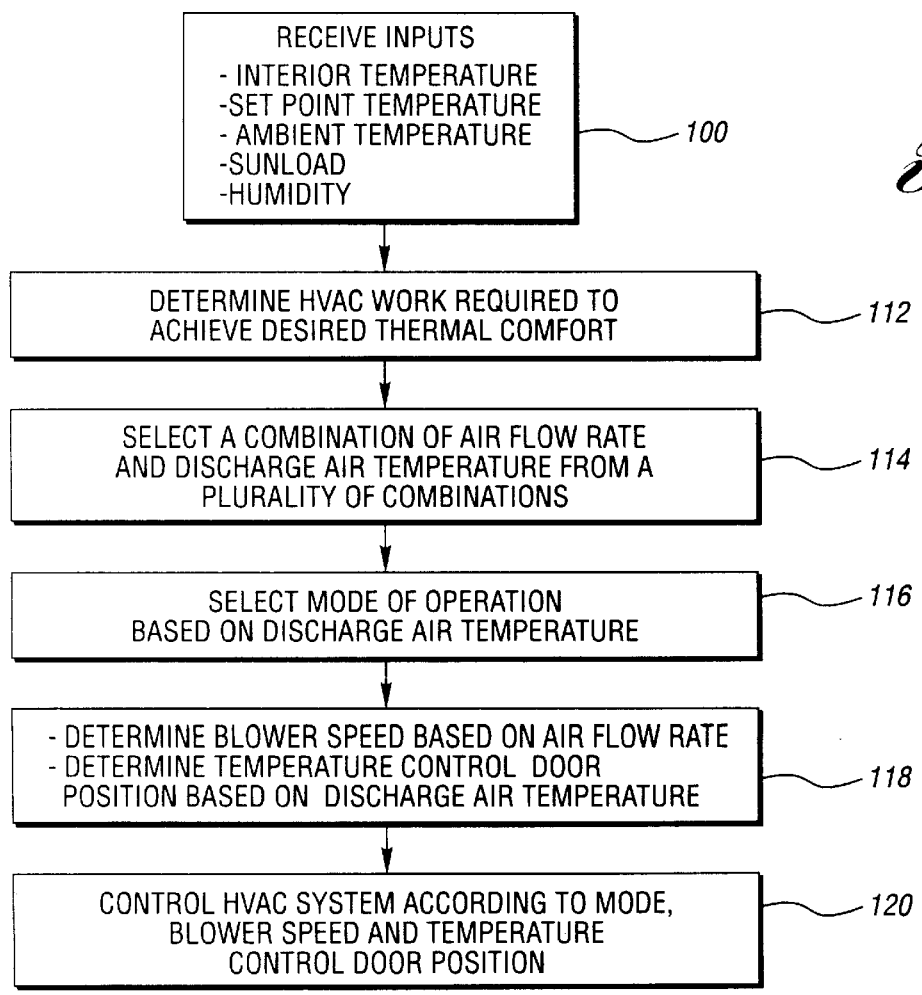
FIG. 3 is a flow diagram illustrating the general sequence of steps associated with the operation of the present invention.

Turning now to FIG. 3, there is shown a flow diagram illustrating the general sequence of steps associated with the method of the present invention. Although the steps shown in FIG. 3 are depicted sequentially, they can be implemented utilizing interrupt-driven programming strategies, object-oriented programming, or the like.

The method begins with the step of receiving a plurality of inputs, as shown at block 100. These inputs include, but are not limited to, interior temperature, set point (or desired) temperature, ambient temperature, sunload, and humidity, as sensed by respective sensors.

The amount of HVAC Work (or power) required to achieve a desired level of comfort is determined next, as shown at block 112. The determination of required HVAC Work is determined using one of two strategies. One strategy utilizes a thermal comfort model, while the second strategy utilizes a target interior temperature model.

In the thermal comfort model strategy, the occupant's thermal comfort, according to a predetermined comfort scale, is estimated as follows:

$$\text{Thermal Comfort} = \text{Offset} + K1*(\text{Tinterior}-72) - K2*(\text{Tsetpoint}-72) + K3*(\text{Tambient}-72) + K4*(\text{Sunload}) + K5*(\text{Work}), \quad (1)$$

where,

Thermal Comfort=thermal comfort rating based on a predetermined thermal comfort rating scale (e.g., 5 out of a scale ranging from 1–9 where 1 equals very cold, 5 equals comfortable, and 9 equals very hot);

Offset and K1–K5 are calibration constants determined either experimentally in a vehicle or by CAE analysis utilizing models of the HVAC system, vehicle interior and thermal comfort;

Tinterior=measured interior temperature in degrees Fahrenheit;

Tsetpoint=occupant's setpoint temperature in degrees Fahrenheit;

Tambient=measured ambient temperature in degrees Fahrenheit;

Sunload=measured sunload (i.e., sensor counts); and

Work=amount of work required to achieve desired thermal comfort rating.

The comfort equation (1) can be rearranged to solve directly for the amount of HVAC Work required to achieve a desired thermal comfort as follows:

$$\text{Work} = [\text{Thermal Comfort} - \text{Offset} - K1*(\text{Tinterior}-72) + K2*(\text{Tsetpoint}-72) - K3*(\text{Tambient}-72) - K4*(\text{Sunload})] / K5 \quad (2)$$

By setting thermal comfort in equation (2) equal to 5, we can determine the amount of HVAC Work required for occupant thermal comfort. A positive value for HVAC Work corresponds to heating in order to achieve comfort, while a negative value corresponds to cooling.

In the target temperature strategy, the amount of HVAC Work required to achieve thermal comfort can be determined based on a target interior temperature. The target interior temperature is the stabilized interior temperature that is found to provide comfort for the vehicle occupants under the current ambient temperature and sunload conditions. The strategy controls the HVAC system output to bring the vehicle's interior temperature to the target interior temperature or desired level of comfort and maintain it accordingly. Target temperature is determined as follows:

$$\text{Target Temperature} = Kt\_\text{Offset}(\text{Tambient}) + Kt1*\text{Qsun} + Kt2*(\text{Tsetpoint}-72) + \text{humid\_comp}(\text{Tinterior},\text{RHinterior}), \quad (3)$$

where,

Target interior Temperature=desired or target stabilized interior temperature;

Tambient=ambient temperature;

Kt_Offset=non-linear function of ambient temperature for compensating for non-linear effect of ambient temperature on the target interior temperature;

Qsun=(255-SunCounts) from the sunload sensor;

Tsetpoint=occupants setpoint temperature;

Kt1, Kt2=calibration constants wherein Kt1 compensates for the effects of sunload on target interior temperature and Kt2 adjusts the target interior temperature for various setpoint temperatures; and humid_comp(Tinterior,RHinterior)=humidity compensation term included on vehicles having an interior humidity sensor which is a non-linear function of the vehicle interior relative humidity measurement, RHinterior, and the vehicle interior temperature measurement, Tinterior.

In this case, the amount of HVAC Work required to achieve the desired target interior temperature is then determined based on a steady-state term and a transient term:

$$\text{WorkDesired} = \text{WorkSteadyState} + \text{WorkTransient} \quad (4)$$

WorkSteadyState is a feed-forward term that calculates the amount of Work, under steady-state conditions that will maintain the vehicle's interior temperature at the target interior temperature. The WorkSteadyState equation is derived from a simple model of the vehicle's interior temperature, Tinterior.

$$d\text{Tinterior}/dt = KW\_\text{Offset} + KW1*\text{Qsun} + KW2*(\text{Tambient}-\text{Tinterior}) + \text{Work} \quad (5)$$

Under steady-state conditions the derivative term drops out and Tinterior becomes Ttarget. Rearranging terms and ignoring sign changes, the simple vehicle model reduces to:

$$\text{Work} = \text{WorkSteadyState} = KW\_\text{Offset} + KW1*\text{Qsun} + KW2*(\text{Tambient}-\text{Ttarget}) \quad (6)$$

where,

KW_Offset, KW1, KW2 are calibration constants, and Ttarget is the target temperature determined from equation (3) above.

The calibration constants KW1 and KW2 are based on the physics of the vehicle, such as glass surface area, insulation, sensor location and sensor type. KW_Offset represents the effects of heat generation inside the vehicle, for example, from vehicle occupants. The calibration constants are calibrated using strictly objective data generated either from vehicle testing or from simulations using a detailed model of the vehicle.

WorkSteadyState is a feedforward term. Based on a simple model of a vehicle, WorkSteadyState determines the amount of HVAC Work that, under stabilized conditions, will result in Tinterior being equal to Ttarget.

WorkTransient comes into play when there is a temperature error, i.e., the interior temperature is not equal to the target interior temperature. The WorkTransient term determines the additional HVAC Work that is required during transient pull-down or warm-up conditions to bring the actual interior temperature towards the target interior temperature. WorkTransient includes a proportional feedback term and an integral feedback term as follows:

$$\text{WorkTransient}=\text{KWP}(\text{Terror})*\text{Terror}+\text{KWI}*\text{IAccumulator}(\text{Terror}) \qquad (7)$$

where,

Terror=Ttarget−Tinterior;

Tinterior=interior temperature measured by the interior sensor;

IAccumulator=integrator (accumulator) based on Terror; and

KWP, KWI=calibration constants.

The proportional term, KWP(Terror)*Terror, defines how fast the vehicle cools down or warms up. KWP may be a non-linear function of Terror. For example, if the temperature error is small, then KWP should be small so as to dampen out the response of the stabilized system. The integrator term is set up to be active only when Terror is small and the temperature control door position or water-valve duty cycle is not saturated. This prevents the integrator from "winding-up" when the system is far from stabilization. IAccumulator is an integrator that sums at a variable rate according to Terror. The larger Terror, the slower the integrator sums. The proportional term is used to get Tinterior close to Ttarget. Once Tinterior is close to Ttarget, the integrator term will take over to reduce the steady-state error.

Combining the steady-state and transient Work terms, the total desired Work is calculated from the following equation:

$$\text{WorkDesired}=[\text{KW\_Offset}+\text{KW1}*\text{Qsun}+\text{KW2}*(\text{Tambient}-\text{Ttarget})]+[\text{KWP}(\text{Terror})*\text{Terror}+\text{KWI}*\text{IAccumulator}] \qquad (8)$$

After the desired HVAC Work has been determined using either the comfort model or the target temperature strategy, the next step is to select a combination of air flow rate and air discharge temperature to realize the desired Work. Work is defined as:

$$\text{Work}=\text{Cp}*\text{Qair}*(\text{Tdischarge}-\text{Ttarget}) \qquad (9)$$

where,

Cp=conversion factor (BTU/(ft^-deg.F.));

Qair=air flow rate in CFM;

Tdischarge=average discharge air temperature; and

Ttarget=target vehicle interior temperature.

Figure 4:
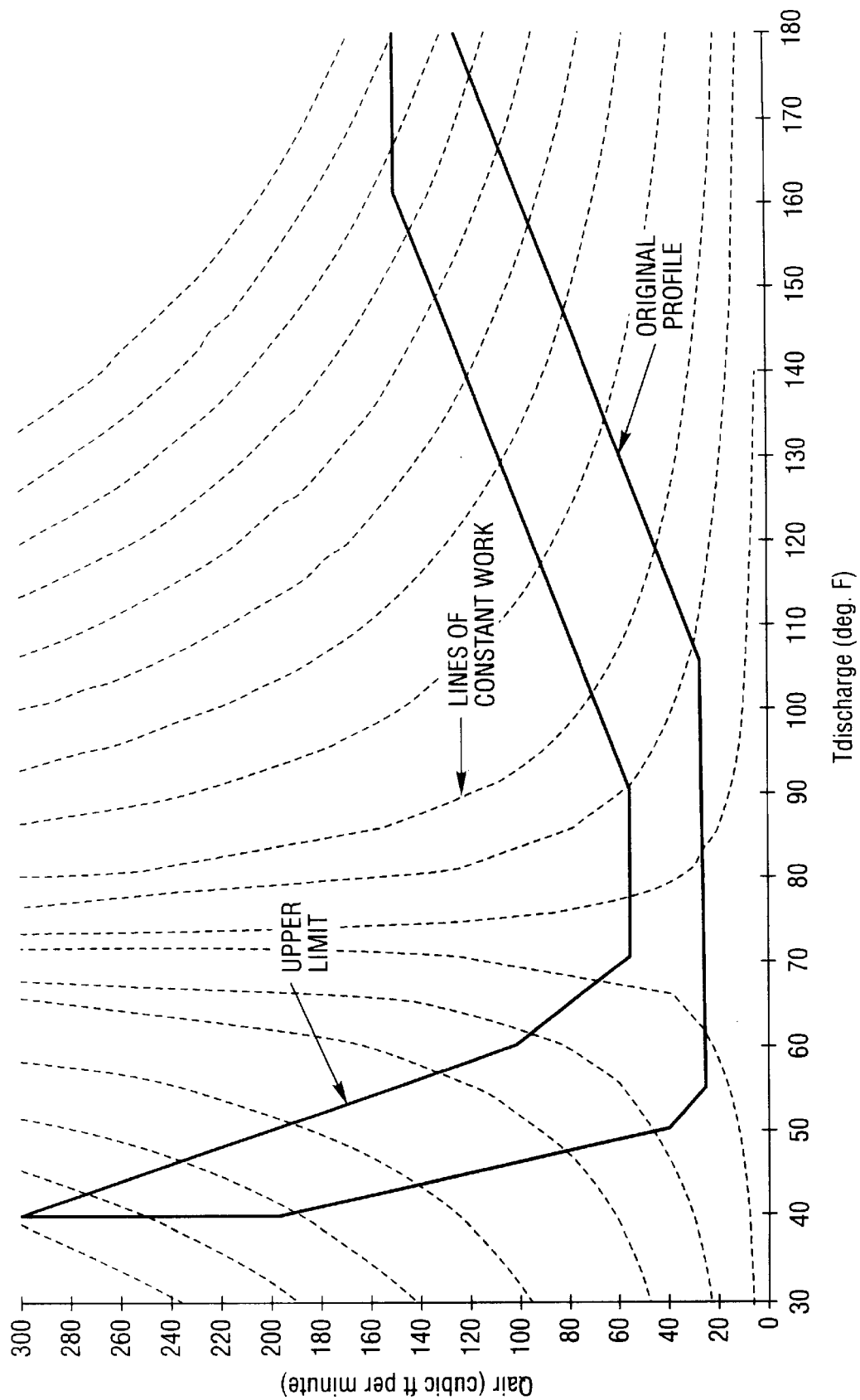
FIG. 4 is a graph illustrating the possible combinations of Qair and Tdischarge for specific values of Work.

Setting Work=WorkDesired defines an infinite number of combinations of Qair and Tdischarge that will result in the desired amount of HVAC Work for comfort. FIG. 4 is a graph illustrating an example of a Qair and Tdischarge combination profile.

As an enhancement to the temperature control strategy described herein, the profile shown in FIG. 4 is bounded in an envelope having an upper bound and a lower bound. One reason for deviating from the profile is for anti-stratification or anti-fogging control. Temperature stratification means hot air accumulates in a pocket near the roof of the vehicle, which can be annoying for a customer. Stratification tends to occur in high ambient, high sunload conditions with low blower speeds. Temperature stratification can be reduced by increasing the air flow rate, thereby promoting more air circulation within the vehicle. In an anti-stratification strategy, the goal is to reduce stratification without compromising overall thermal comfort. To achieve this the air flow rate must increase and at the same time the discharge air temperature must be adjusted to maintain comfort. Essentially, the same amount of HVAC Work should be generated but with a different combination of Qair and Tdischarge. The equation for HVAC Work illustrates how to adjust the discharge air temperature to maintain constant Work input while changing the air flow rate. As Qair is increased, an envelope of allowable Qair and Tdischarge combinations can be used to limit the deviation from the original profile. The boundaries for the envelope are established based on capacity limitations of the system and on subjective ergonomic considerations. The minimum and maximum supply air temperatures are fixed by the HVAC system's cooling and heating capacity. The maximum supply air quantity is fixed by the capacity of the blower motor and ducting system. A minimum supply air quantity is set to ensure a stable cabin temperature with a small amount of cabin air circulation. Within the capacity limits of the system, an envelope is established that does not contain any combination of supply air temperature and quantity that may result in thermal discomfort or "annoyance" for the cabin occupants.

The optimal combination of Qair and Tdischarge is based upon specific control objectives to be met. For example, to reduce blower noise, a combination that minimizes air flow quantity may be chosen. On the other hand, to reduce cabin temperature stratification, a combination with a relatively large air flow quantity may be chosen. The controller 44 selects the proper combination within a bounded envelope based on the thermal state in the cabin (i.e., interior temperature) and the outside environment (i.e., ambient temperature).

The profile in FIG. 4 can be correlated to WorkDesired using a look-up table and the re-arranged equation for Work:

$$\text{Qair}=\text{LookUp}(\text{WorkDesired}) \qquad (10)$$

$$\text{Tdischarge}=(\text{WorkDesired}/\text{Qair})+\text{Ttarget} \qquad (11)$$

A known customer complaint is excessive air flow upon start-up in mild ambient conditions. This occurs when the ambient temperature is mild but the initial interior temperature sensor reading is high because the vehicle has been soaking in the sun. Upon start-up, the temperature control strategy calls for high blower voltage due to the high interior temperature sensor reading. Because of the mild ambient, the vehicle cools down quickly, resulting in a sort of initial blast of air.

The air flow rate can be limited to prevent the initial blast of air if the conditions are such that the cooling or heating load on the vehicle is small. The magnitude of WorkSteadyState provides an indication of the cooling or heating load on the vehicle. If the magnitude of WorkSteadyState is small, the amount of HVAC Work necessary for comfort is also small. A simple strategy using WorkSteadyState to prevent excessive air flow rates upon start-up is achieved by first calculating an upper limit for Qair (Qair_limit= LookUp(absolute_value(WorkSteadyState)) and then comparing the value of Qair determined by the base comfort strategy to the upper limit and taking the minimum of the two (Set Qair=minimum {Qair_desired, Qair_limit}).

Once the combination of Qair and Tdischarge have been chosen, the selection of air flow direction (or mode) is determined based on desired discharge temperature, as shown at block 116. Based on experience, it is known what mode (i.e., panel, floor, mix, recirc) is preferred for a given discharge air temperature. For example, if the discharge air drops below 90 degrees F., the mode is shifted from floor mode to mix mode and then to panel mode if the discharge air drops below 75 degrees F.

The air flow quantity and discharge temperature is then converted to actual system outputs, i.e., blower voltage and temperature control door position (or water-valve duty cycle), as shown at block 118. This is accomplished utilizing simple models of airflow and discharge air temperature.

In a temperature control door system, the discharge air temperature is primarily a function of the temperature control door position, engine coolant temperature, air conditioner clutch status and ambient temperature. An example of mapping from discharge air temperature to temperature control door position is as follows:

$$BlendPosition = [Tdesired/(Tmax-Tmin)]*100 \quad (12)$$

where,

BlendPosition=temperature control door position (0%= full cool, 100%=full heat);

Tmax=E1*(Tengine−Tambient)+Tambient;

E1=typical value for heater core effectiveness;

Tmin=minimum temperature with clutch on or ambient temperature with clutch off.

If the temperature control door has a non-linear response, a look-up table may be used for linearization.

If the system uses a water-valve rather than a temperature control door, the temperature control door mapping would be replaced with a typical water-value controller strategy with one of the inputs being desired discharge air temperature.

In a temperature control door system, air flow is primarily a function of blower voltage, mode and temperature control door position. An example of a mapping from Qair to blower volts for a given mode is:

$$BlowerVolts(temperature\ control\ door\ system) = [(Qair*VOLTSmax)/(BlendPosition*(Qcold-Qhot)] \quad (13)$$

where,

VOLTSmax=maximum blower voltage (e.g., 13 volts);

Qcold=measured Qair at VOLTSmax and BlendPosition=0 for a given mode;

Qhot=measured Qair at VOLTSmax and BlendPosition=100 for a given mode.

If the system uses a water-valve rather than a temperature control door, the mapping is simpler:

$$BlowerVolts(water\text{-}valve\ system) = [(Qair*VOLTSmax)/Q] \quad (14)$$

where,

VOLTSmax=maximum blower voltage (e.g., 13 volts); and

Q=measured Qair at VOLTSmax for a given mode.

Finally, the HVAC system is controlled by controller 44 according to the mode, blower speed and temperature control door position required to achieve a desired level of thermal comfort, as shown at block 120.

The primary motivation for generating the new temperature control strategy is to provide the opportunity for strategy development using CAE tools. Another motivation for generating the new temperature control strategy is to make the calibration procedure more objective and structured. Much of the calibration for this strategy can be achieved with a single design of experiments (DOE) performed with a vehicle in a wind tunnel or simulated using CAE tools. The calibration process can be categorized into four sets of tests or simulations: 1) DOE; 2) Air flow rate to blower voltage mapping; 3) Discharge temperature to temperature control door position (or water-valve duty cycle) mapping; and 4) Validation testing.

The DOE generates objective as well as subjective data for various combinations of ambient temperature and sunload. If the target temperature strategy is utilized, the data generated from the DOE is used to determine the calibration variables necessary to calculate Ttarget, WorkDesired, Qair desired, and Tdischarge desired. The DOE consists of eight tests which span practical combinations of environmental conditions. The tests are run in a random or blocked order to avoid unwanted data correlation. The conditions for the eight tests are summarized below:

| TEST NUMBER | AMBIENT TEMP (F.) | SUNLOAD (full or none) |
|---|---|---|
| 1 | 100 | full |
| 2 | 100 | none |
| 3 | 70 | full |
| 4 | 70 | none |
| 5 | 40 | full |
| 6 | 40 | none |
| 7 | 10 | full |
| 8 | 10 | none |

The general procedure for the DOE vehicle testing is fairly straightforward. At each of the eight environmental conditions, the vehicle is soaked to a stabilized interior temperature. Once the vehicle has stabilized, a pull-down or warm-up test is performed with one or two experienced evaluators controlling the HVAC system (mode, air flow rate, discharge air temperature) as they normally would control a manual system to reach and maintain thermal comfort. Each test should be run for approximately 35 minutes to ensure a stabilized, comfortable interior temperature has been reached.

Alternatively, each pull-down or warm-up in the DOE may be simulated using CAE tools. The same testing procedures are followed with the exception of the thermal comfort model replacing the experienced evaluators. Comfort ratings from the thermal comfort model are used as feedback to regulate the HVAC Work input so the model reaches and maintains comfort. The Qair and Tdischarge profile and mode shift points used in the simulation are based on previously accepted calibrations. In addition to adding comfort rating feedback, sunload and interior sensor models are included as part of the CAE tool.

Using data from the steady-state portion of the DOE tests, values for the calibration constants associated with the calculation of Ttarget and WorkSteadyState (i.e., KT_Offset(Tambient), KT1, KW_Offset, KW1 and KW2) can be established. Data from the transient portion of the DOE tests can be used to determine appropriate values for the calibration constants used in the calculation of WorkTransient. Finally, the data from both the steady-state and transient portions of the tests are used to form the desired Qair versus Tdischarge combinations and mode shift points.

The first step is to find calibration values for the Ttarget equation:

$$Ttarget = KT\_Offset(Tambient) + KT1*Qsun + KT3(Tsetpoint-72) \quad (15)$$

Ttarget for each of the eight DOE tests is the stabilized interior temperature that provides thermal comfort for the evaluators. As mentioned previously, determining Ttarget for different environmental conditions is the fundamental subjective calibration required for the strategy. From initial testing, Ttarget appears to be a non-linear function of Tambient and a linear function of Qsun. Because of the non-linear nature of KT_Offset(Tambient), a look-up table is used for ambient compensation. To generate the KT_Offset(Tambient) ambient compensation look-up table, data from the four DOE tests that were run with no sunload is used, i.e., tests 2, 4, 6 and 8.

Because sunload appears to effect Ttarget in a linear manner, a single constant can be used for sunload compensation. Testing shows that full, rather than no sunload, tends to reduce Ttarget by about 2 deg.F. Establishing a value for the sunload compensation gain, KT1, is thus a very straightforward process.

KT2 is the temperature control set-point gain. KT2 adjusts Ttarget for temperature control set-points that differ from the standard set-point of 72. Once an agreed upon set-point gain has been established, it should not vary much from vehicle to vehicle.

The second step is to use the DOE data to find values for the WorkSteadyState equation calibration constants:

$$\text{WorkSteadyState} = \text{KW\_Offset} + \text{KW1}*\text{Qsun} + \text{KW2}(\text{Tambient} - \text{Ttarget}) \quad (6)$$

Since the WorkSteadyState equation is a simple steady-state model of the vehicle's interior temperature, the values for KW_Offset, KW1 and KW2 are based strictly on the steady-state response of the vehicle, not on subjective evaluations. The averaged steady-state data from the end of the DOE tests and regression analysis is used to find least-squares fit values for the calibration constants.

Vehicle testing indicates that the cooling response of a vehicle is different from its heating response. To accommodate this fact, two sets of calibration values are used, one set for heating and the other set for cooling: KW_OffsetH, KW1H, KW2H and KW_OffsetC, KW1C and KW2C. WorkSteadyStateHot and WorkSteadyStateCold is calculated and the smaller of the two is used for WorkSteadyState.

The third step is to use the transient warm-up and cool down data to find values for the proportional gain term in the transient Work equation:

$$\text{WorkTransient} = \text{KWP}(\text{Terror})*\text{Terror} + \text{KWI}*\text{IAccumulator}(\text{Terror}) \quad (7)$$

By plotting the transient response of (WorkDesired−WorkSteadyState) versus Terror for all eight DOE tests, the KWP gain can be determined. The heating gain may be different from the cooling gain. It is helpful to reduce the gain for very small values of Terror to add some dampening to the stabilized system. Because of the non-linear nature of KWP, the gain becomes a look-up table function of Terror.

The purpose of the integral term, KWI*IAccumulator (Terror), is to reduce the steady-state Terror when the system has stabilized or is close to being stabilized. IAccumulator (Terror) has a variable summation rate. Since it is desirable to have the integral term only take effect when the system is close to stabilization, the integrator is summed more often as Terror decreases. The selection of values for the KWI gain and the IAccumulator(Terror) summation rate is essentially done using trial and error time-simulations or vehicle tests.

The final step of the data analysis process is to define the desired Qair and Tdischarge combination profile. The profile is really a relationship between three parameters, Qair, Tdischarge and Work, where Work=Qair*(Tdischarge−Ttarget). For a given WorkDesired, a look-up table is used to determine Qair desired. With WorkDesired and Qair desired, known, Tdischarge desired is calculated using the Work equation.

Once the desired air flow rate is known, a mapping from Qair to blower volts is utilized to calculate the desired blower output. A mapping between Tdischarge and temperature control door position (or water-valve duty cycle) is also utilized. These mapping are performed as described above.

The final phase of the calibration process is validation testing for fine-tuning the initial calibration.

The use of a comfort model in an automotive climate control strategy ensures that the goal of making vehicle occupants comfortable is kept at the forefront of design considerations. If there are compromises to be made, the degree to which they affect comfort is readily discernible. Casting the control algorithm in terms of a comfort model allows connection to a more general point of reference, the expression of comfort in human-oriented variables. This connection allows a path between more general simulation models and models formulated with only vehicle specific variables. Likewise, a more direct connection between comfort as experienced by occupants and control equation parameters allows a more direct and systematic calibration procedure.

While the best modes for carrying out the invention have been described in detail, those familiar with the art to which this invention relates will recognize various alternative designs and embodiments for practicing the invention as defined by the following claims.

What is claimed is:

1. A method for automatically controlling a heating, ventilation and air-conditioning (HVAC) system of a vehicle to achieve thermal comfort of an occupant of the automotive vehicle, the method comprising:

receiving a plurality of input signals;

determining a desired amount of HVAC Work necessary to achieve the thermal comfort based on the plurality of input signals and a thermal comfort model;

determining a combination of air flow rate and discharge air temperature from a plurality of possible combinations to realize the desired amount of HVAC Work based on the plurality of input signals; and controlling the HVAC system based on the combination of air flow rate and discharge air temperature.

2. The method as recited in claim 1 wherein the thermal comfort model is based on a predetermined thermal comfort rating scale.

3. The method as recited in claim 1 wherein receiving the plurality of input signals includes sensing an interior temperature of the vehicle and an ambient temperature and wherein determining the combination further includes determining the air flow rate based on the interior temperature and the ambient temperature.

4. The method as recited in claim 3 wherein determining the air flow rate further includes determining a desired upper limit of air flow rate to minimize noise from the HVAC system.

5. The method as recited in claim 3 wherein determining the combination further includes determining the discharge air temperature based on the air flow rate so as to maintain the desired amount of HVAC Work.

6. A system for automatically controlling a heating, ventilation and air-conditioning (HVAC) system of a vehicle to achieve thermal comfort of an occupant of the automotive vehicle, the system comprising:

a plurality of sensors for sensing a plurality of input signals; and a controller operative to determine a desired amount of HVAC Work necessary to achieve the thermal comfort based on the plurality of input signals and a thermal comfort model, determine a combination of air flow rate and discharge air temperature from a plurality of possible combinations to realize the desired amount of HVAC Work based on the plurality of input signals, and control the HVAC system based on the combination of air flow rate and discharge air temperature.

7. The system as recited in claim 6 wherein the HVAC system includes actuators having various control positions for controlling the direction of air flow and wherein the controller, in controlling the HVAC system, is further operative to control the actuators based on the discharge air temperature.

8. The system as recited in claim 7 wherein the HVAC system includes a variable speed blower and wherein the controller, in controlling the HVAC system, is further operative to control the variable speed blower based on the air flow rate.

9. The system as recited in claim 8 wherein the HVAC system includes a temperature control door for varying air temperature and wherein the controller, in controlling the HVAC system, is further operative to control the temperature control door based on the discharge air temperature.

10. The system as recited in claim 6 wherein the controller, in determining the combination is further operative to determine the discharge air temperature based on the air flow rate so as to maintain the desired amount of HVAC Work.

11. The system as recited in claim 6 wherein the thermal comfort model is based on a predetermined comfort rating scale.

* * * * *